US010049648B2

(12) United States Patent
Klanner et al.

(10) Patent No.: US 10,049,648 B2
(45) Date of Patent: Aug. 14, 2018

(54) MUSICAL STRING AND METHOD OF PRODUCING A STRING CORE FOR A MUSICAL STRING

(71) Applicant: Thomastik-Infeld Gesellschaft m.b.H., Vienna (AT)

(72) Inventors: Franz Klanner, Vienna (AT); Martin Küblböck, Vienna (AT)

(73) Assignee: THOMASTIK-INFELD GESELLSCHAFT M.B.H., Vienna (AT)

(*) Notice: Subject to any disclaimer, the term of this patent is extended or adjusted under 35 U.S.C. 154(b) by 0 days.

(21) Appl. No.: 15/608,629

(22) Filed: May 30, 2017

(65) Prior Publication Data

US 2017/0352335 A1 Dec. 7, 2017

(30) Foreign Application Priority Data

Jun. 3, 2016 (AT) .............................. A 50512/2016

(51) Int. Cl.
*G01D 3/10* (2006.01)
*G10D 3/10* (2006.01)

(52) U.S. Cl.
CPC ...................................... *G10D 3/10* (2013.01)

(58) Field of Classification Search
CPC .................................. G10D 3/00; G10D 3/10
See application file for complete search history.

(56) References Cited

U.S. PATENT DOCUMENTS 4,232,073 A * 11/1980 Okamoto ............... D03D 15/00 26/29 R
6,307,156 B1 * 10/2001 Avellanet .............. B21C 37/045 174/128.1

FOREIGN PATENT DOCUMENTS

| | | |
|---|---|---|
| CN | 201084387 | 7/2008 |
| DE | 102006038445 | 2/2008 |
| JP | H 03-205070 | 9/1991 |
| WO | WO 2009/039538 | 4/2009 |

OTHER PUBLICATIONS

Austrian Search Report dated Feb. 17, 2017 in corresponding Austrian patent Application No. A 50512/2016.
English translation of Austrian Search Report dated Feb. 17, 2017 in corresponding Austrian patent Application No. A 50512/2016.

* cited by examiner

*Primary Examiner* — Kimberly Lockett
(74) *Attorney, Agent, or Firm* — Henry M. Feiereisen LLC

(57) ABSTRACT

A musical string, in particular a musical string for a string instrument, includes at least one load-bearing string core having a first plastic fiber with a first cross-sectional shape and a first cross-sectional surface area. The string core further has a second plastic fiber with a second cross-sectional shape and a second cross-sectional surface area. The first cross-sectional shape is different from the second cross-sectional shape, and/or the first cross-sectional surface area is different from the second cross-sectional surface area.

20 Claims, 5 Drawing Sheets

MUSICAL STRING AND METHOD OF PRODUCING A STRING CORE FOR A MUSICAL STRING

CROSS-REFERENCES TO RELATED APPLICATIONS

This application claims the priority of Austrian Patent Application, Serial No. A 50512/2016, filed Jun. 3, 2016, pursuant to 35 U.S.C. 119(a)-(d), the disclosure of which is incorporated herein by reference in its entirety as if fully set forth herein.

BACKGROUND OF THE INVENTION

The present invention relates to a musical string and to a method of producing a string core for a musical string.

The following discussion of related art is provided to assist the reader in understanding the advantages of the invention, and is not to be construed as an admission that this related art is prior art to this invention.

It is known to form a string core of a musical string either from metal wire(s), from animal gut or from plastic fibers, wherein the different designs have advantages depending on the raw material used and on the intended use. With regard to sound quality, as well as the possibility of being able to produce musical strings with properties that are as identical as possible, plastic fibers or plastic strands have proven to be particularly advantageous as a material for a string core of a musical string. Such string cores have a plurality of identical plastic fibers. This leads to restrictions and limits on the achievable technical and acoustic properties of the musical strings.

FIG. 1 shows a conventional musical string 100. The musical string 100 has seven plastic fibers 35. Each plastic fiber 35 has a cross-section, which has a cross-sectional shape or a geometric shape and a surface area or cross-sectional surface area. As shown in FIG. 1, all plastic fibers 35 have identical cross-sectional shapes and cross-sectional surface areas. The plastic fibers 35 are arranged so as to bear against one another.

It would therefore be desirable and advantageous to provide an improved musical string which obviates prior art shortcomings and has enhanced possibilities in terms of sound adjustment.

SUMMARY OF THE INVENTION

According to one aspect of the present invention, a musical string, in particular a musical string for a string instrument, includes a load-bearing string core having first and second plastic fibers, with the first plastic fiber having a first cross-sectional shape and a first cross-sectional surface area, and with the second plastic fiber having a second cross-sectional shape and a second cross-sectional surface area, wherein the first cross-sectional shape is different from the second cross-sectional shape, and/or wherein the first cross-sectional surface area is different from the second cross-sectional surface area.

A musical string can thus be created which has enhanced sound properties and possibilities compared to conventional musical strings having a string core made of identically formed plastic fibers. The handling, response and life span of a musical string can thus be influenced over wider ranges.

In a string core, the fiber surface content or fiber volume content can thus be set in a targeted manner over very wide ranges. This can also be referred to as the packing density.

In particular, it has been found that an increase in the fiber surface content or a high fiber surface content in a musical string tends to lead to a full or fuller sound. In particular, it has also been found that a reduction in the fiber surface content or a low fiber surface content tends to lead to a more brilliant sound of the musical string in question. Further possibilities thus exist for influencing or controlling the sound characteristic of a musical string in a targeted manner.

In addition, the load-bearing capacity of the string core can be influenced via the fiber surface content or packing density, and this also has a direct effect on the sound of the musical string.

Above all, by shaping the at least two plastic fibers differently, it is possible to influence the number of contact regions between said plastic fibers and also the friction between the plastic fibers, as a result of which the internal friction of the core, and thus the damping of the musical string, can be directly influenced in a predefinable manner.

According to another aspect of the present invention, a method for producing a string core for a musical string includes passing a predefinable number of first plastic fibers and a predefinable number of second plastic fibers through a perforated mask, and bringing the first plastic fibers and the second plastic fibers together, with a position of the first and second plastic fibers relative to one another being determined by the perforated mask.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
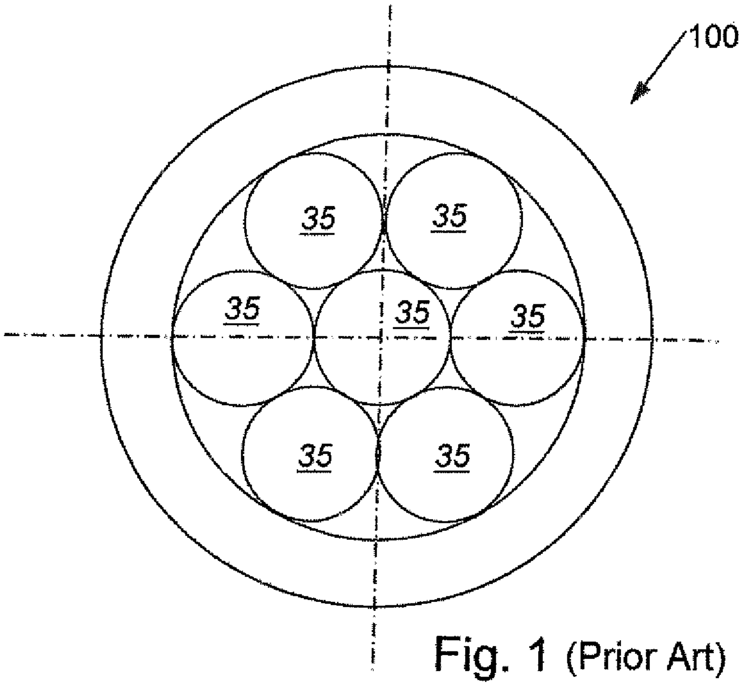
Fig. 1 (Prior Art)
FIG. 1 shows a cross sectional view of a conventional musical string.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

FIGS. 2 to 6 and 8 show preferred embodiments of a musical string 1, in particular a musical string for a string instrument, wherein the musical string 1 has at least one load-bearing string core 2. The string core 2 includes at least one first plastic fiber 3 having a first cross-sectional shape and a first cross-sectional surface area, and at least one second plastic fiber 4 having a second cross-sectional shape and a second cross-sectional surface area, with the first plastic fiber 3 being arranged in particular so as to bear against the second plastic fiber 4. The first cross-sectional shape is different from the second cross-sectional shape, and/or the first cross-sectional surface area is different from the second cross-sectional surface area.

A musical string 1 can thus be created which has enhanced sound properties and possibilities compared to conventional musical strings 1 having a string core 2 made of identically formed plastic fibers 3. The handling, response and life span of a musical string 1 can thus be influenced over wider ranges.

In a string core 2, the fiber surface content or fiber volume content can thus be set in a targeted manner over very wide ranges. This can also be referred to as the packing density. In particular, it has been found that an increase in the fiber surface content or a high fiber surface content in a musical string 1 tends to lead to a full or fuller sound. In particular, it has also been found that a reduction in the fiber surface content or a low fiber surface content tends to lead to a more brilliant sound of the musical string 1 in question. Further possibilities thus exist for influencing or controlling the sound characteristic of a musical string 1 in a targeted manner.

In addition, the load-bearing capacity of the string core 2 can be influenced via the fiber surface content or packing density, and this also has a direct effect on the sound of the musical string 1.

Above all, by shaping the at least two plastic fibers 3, 4, 5, 6, 7 differently, it is possible to influence the number of contact regions between said plastic fibers and also the friction between the plastic fibers 3, 4, 5, 6, 7, as a result of which the internal friction of the string core 2, and thus the damping of the musical string 1, can be directly influenced in a predefinable manner.

The various embodiments shown in FIGS. 2 to 8 are illustrated in a simplified form. The proportions need not correspond to the intended real proportions. For the sake of better comprehension, individual parts may be illustrated on a greatly enlarged scale or with considerably exaggerated proportions. Furthermore, in the drawings, the individual parts of the illustrated musical strings 1 are in some cases shown as bearing directly against one another, but real musical strings 1 may in this regard have partial spacings between individual parts and/or at individual points.

One preferred field of use of such musical strings 1 concerns the instruments of the violin family, that is to say the violin, the viola, the cello and the double bass. Further preferred instruments for the use of musical strings 1 according to the invention are the Viola da Gamba and Viola d'Amore. Such musical strings 1 according to the invention may be provided for all bowed string instruments.

Musical strings 1 according to the present invention are intended to generate sound-emitting vibrations, wherein a particular type of musical string 1 is intended for use on a particular type of musical instrument, and moreover have a tuning tone and a so-called tuning weight as features, wherein the tuning tone indicates the fundamental tone at which a partial length section of the musical string 1—within the total length of the musical string 1 between the end regions thereof—of the length of the mensur of the particular type of musical instrument vibrates when the musical string 1 is loaded with the tuning weight, and therefore tensioned, and is of course set in vibration.

Musical strings 1 according to the present invention have a string core 2 which is intended and designed to absorb the load or tension to which the musical string 1 is exposed in the state tensioned on a musical instrument.

The musical string 1 according to the present invention advantageously has a substantially cylindrical outer contour when the musical string 1 is tensioned.

Musical strings 1 for string instruments for lower pitches usually have wrappings or at least one first wrapping layer 9 in order to increase the mass of the musical string 1. The fundamental frequency at which a musical string 1 vibrates depends on the vibrating length or mensur of the musical string 1 in question, on the force with which the musical string 1 in question is tensioned, and on the mass of the musical string 1. It is preferably provided that the musical string 1 has at least one first wrapping layer 9 which has at least one first wrapping element, wherein the at least one first wrapping element is wrapped helically around the string core 2.

Provision may advantageously be made for the musical string 1 to have at least one second or further wrapping layer 28 which is arranged around the first wrapping layer 9 or between the first wrapping layer 9 and the string core 2.

Advantageously, the at least one first wrapping element of the first wrapping layer 9, or further wrapping elements of further wrapping layers 28, is configured as a strip with a substantially rectangular cross-section and predefinable edge shaping, wherein it may also be provided to arrange a plurality of strips in the form of a multi-start helix in the first wrapping layer 9. It may also be provided that one or more wrapping elements are configured as a round wire.

It is particularly advantageous to form the at least one round wire or the at least one strip of at least one material selected from the group: aluminium, magnesium, iron, chromium, nickel, silicon, silver, gold, platinum, rhodium, copper and tungsten, wherein each of the aforementioned substances may be provided as a pure substance in the technical sense or else as a constituent of an alloy. Musical strings 1 which have proven to be particularly advantageous are those in which the at least one round wire or the at least one strip is formed of at least one alloy selected from the group: steel, aluminium-magnesium alloys, aluminium-magnesium-manganese alloys, silver-copper alloys, silver-platinum alloys, silver-rhodium alloys, silver-palladium alloys, and iron-chromium-nickel-silicon-aluminium alloys.

The string core 2 has a predefinable plurality of plastic fibers 3, 4, 5, 6, 7. Any type of plastic may be provided for the plastic fibers 3, 4, 5, 6, 7 or filaments, for example including polymers, in particular including polyamides, aramide, PEK, PAEK, PEEK, PBT, polyester, nylon, polyethylene, PET, PEET, PES, PE, PP, POM, PTFE, PVDF, PVDC, HPPE (High Performance Polyethylene), PA and/or PVC.

It may be provided that at least one of the plastic fibers 3, 4, 5, 6, 7 is formed of a self-healing plastic. In such a self-healing plastic, micro-cracks close automatically. The use of such self-healing plastics in string cores 2 of musical strings 1 can also be provided in all other musical strings 1, and is not limited to the musical string 1 according to the invention.

According to the present invention, a so-called single filament or monofilament is provided as the plastic fiber 3, 4, 5, 6, 7, i.e. a unit that cannot be further split into smaller or thinner fibers. However, it may be provided that, according to the present invention, a predefinable number of corresponding plastic fibers 3, 4, 5, 6, 7 together form a plastic strand 31, and the string core comprises one such plastic strand 31 or a plurality of such plastic strands. One such plastic strand 31 is shown for example in FIG. 4 as part of a string core 2.

The plastic fibers 3, 4, 5, 6, 7 of the string core 2 are the load-bearing elements of the string core 2 and run substantially in the longitudinal direction or along the extension of the musical string 1, it also being possible for these to be screwed in.

A musical string 1 according to the present invention has at least two different plastic fibers 3, 4, 5, 6, 7 or types of plastic fiber, namely at least one first plastic fiber 3 and at least one second plastic fiber 4, which differ from one another in terms of their cross-sectional shapes and/or cross-sectional surface areas, and therefore in terms of the respective size or surface area of the cross-sectional surfaces.

The cross-section of the first plastic fiber 3 has a first geometric shape, which is referred to as the first cross-sectional shape, and a first surface area, which is referred to as the first cross-sectional surface area. The cross-section of the second plastic fiber 4 has a second geometric shape, which is referred to as the second cross-sectional shape, and a second surface area, which is referred to as the second cross-sectional surface area.

It is therefore provided that—at one and the same section through the musical string 1—the first cross-sectional shape of the first plastic fiber 3 is different from the second cross-sectional shape of the second plastic fiber 4, and/or that the first cross-sectional surface area of the first plastic fiber 3 is different from the second cross-sectional surface area of the second plastic fiber 4. The aforementioned advantageous effects can thus be achieved. The section through the musical string 1 is normal to the longitudinal extension thereof.

For each type of plastic fiber 3, 4, 5, 6, 7, that is to say first or second or further plastic fiber 3, 4, 5, 6, 7, any number or plurality of plastic fibers 3, 4, 5, 6, 7 may be arranged in the string core 2.

Besides first and second plastic fibers 3, 4, any number of further plastic fibers 3, 4, 5, 6, 7 may be arranged in the string core 2, wherein these differ in each case from the other plastic fibers 3, 4, 5, 6, 7 or types of plastic fibers 3, 4, 5, 6, 7 in terms of their cross-sectional surface area and/or cross-sectional shape. In particular, it is provided that the string core 2 has at least one third plastic fiber 5 having a third cross-sectional shape and a third cross-sectional surface area, wherein the third plastic fiber 5 is arranged in particular so as to bear against the first plastic fiber 3 and the second plastic fiber 4, and that the third cross-sectional shape is different from the first cross-sectional shape and from the second cross-sectional shape, and/or that the third cross-sectional surface area is different from the first cross-sectional surface area and from the second cross-sectional surface area.

According to the present invention, preferred embodiments of musical strings 1 are described with up to five different plastic fibers 3, 4, 5, 6, 7. Unless ruled out, embodiments relating to the first and/or second plastic fibers 3, 4 can in each case be applied to further plastic fibers 3, 4, 5, 6, 7.

According to the present invention, the differentiation between first, second and further plastic fibers 3, 4, 5, 6, 7 is preferably made only on the basis of the cross-sectional shape and/or the cross-sectional surface area, but not on the basis of the type of plastic from which the individual plastic fibers 3, 4, 5, 6, 7 are made. In this case, it may be provided that all first plastic fibers 3 are made of one and the same type of plastic, but it may also be provided that a first group within the first plastic fibers 3 is made of a first type of plastic and a second group within the first plastic fibers 3 is made of a second type of plastic, wherein it is also possible for there to be more than two different types of plastic within the first plastic fibers 3. This can of course also be applied analogously to the further plastic fibers 3, 4, 5, 6, 7 and is not limited to the first plastic fibers 3.

It may also be provided that the first and second plastic fibers 3, 4 are formed or made of one and the same type of plastic. It may also be provided that the plastic fibers 3, 4, 5, 6, 7 are each made of different types of plastic. This also applies analogously to all the different plastic fibers 3, 4, 5, 6, 7.

In particular, it may be provided that the different surface properties of polar and non-polar plastics are used to influence the internal friction of the string core 2. The points or areas of contact between the plastic fibers can be set by way of different cross-sectional shapes.

In the case of polar plastics, besides the friction, further surface effects come into play, through which the packing density can be further increased slightly. These are atomic bonding, hydrogen bridge bonding, and dipole-dipole interaction. These bring about adhesion between the plastic fibers 3, 4, 5, 6, 7.

As described above, the plastic fibers 3, 4, 5, 6, 7 can differ in terms of the cross-sectional shape. Besides the circular cross-sectional shape, which is by far the most common, the plastic fibers 3, 4, 5, 6, 7 may have any other cross-sectional shapes. Both concave and convex cross-sectional shapes are provided. In particular, it is provided that the first cross-sectional shape and/or the second cross-sectional shape is circular or elliptical or kidney-shaped or star-shaped or crescent-shaped or cloud-shaped or mushroom-shaped or bone-shaped or number-eight-shaped or Y-shaped or X-shaped or C-shaped or polygonal, in particular triangular, quadrangular, pentagonal or hexagonal.

Different cross-sectional shapes are used in the individual exemplary embodiments. Further preferred cross-sectional shapes are additionally shown in FIG. 7. The designations of the different cross-sectional shapes in the figures are as follows. In the figures: 10 is circular, 11 is hexagonal, 12 is triangular, 13 is elliptical, 14 is crescent-shaped, 15 is C-shaped, 16 is shaped as an irregular star, 17 is shaped as a regular five-pointed star, 18 is shaped as a regular sixteen-pointed star, 19 is kidney-shaped or bean-shaped, 21 is Y-shaped, 22 is cloud-shaped, 23 is mushroom-shaped, 24 is bone-shaped or double-T-shaped, 25 is number-eight-shaped, 27 is rectangular.

Advantageously, the first plastic fiber 3 and/or the second plastic fiber 4 is designed as a solid fiber. It may also be provided in each case that the first plastic fiber 3 and/or the second plastic fiber 4 is designed as a hollow fiber 26, as a result of which the load-bearing fiber content on the string core 2 can be reduced.

As already described above, one of the particular effects of a musical string 1 according to the present invention is that, during development of the musical string 1, the packing density of the plastic fibers 3, 4, 5, 6, 7 in the string core 2 can be varied over wide ranges.

In order to achieve a high or higher packing density or fiber surface content, it has proven to be advantageous to place "thinner" second plastic fibers 4 in the intermediate spaces between "large" or "thick" first plastic fibers 3. The second plastic fibers 4 preferably each have dimensions which fill said intermediate spaces well, and/or which are in contact with the bordering first plastic fibers 3.

Provision is therefore advantageously made for the string core 2 to have at least two, in particular at least three, first plastic fibers 3 arranged so as to bear against one another in a predefinable manner, and for at least one second plastic fiber 4 to be arranged adjacent to or bearing against the at least two first plastic fibers 3, advantageously in at least one intermediate space between the first plastic fibers 3. The at least one second plastic fiber 4 therefore bears against both adjacent first plastic fibers 3.

Advantageously at least one second plastic fiber 4 bears simultaneously against each of the two first adjacent first plastic fibers 3 substantially over the entire length. In any case, the at least one second plastic fiber 4 bears against the adjacent first plastic fibers 3 in the region of a predefinable cross-section through the musical string.

Advantageously, the second cross-sectional surface area and/or the second cross-sectional shape of the second plastic fiber 4 is such that the second plastic fiber 4 bears against the at least two first plastic fibers 3 bordering the intermediate space.

Figure 2:
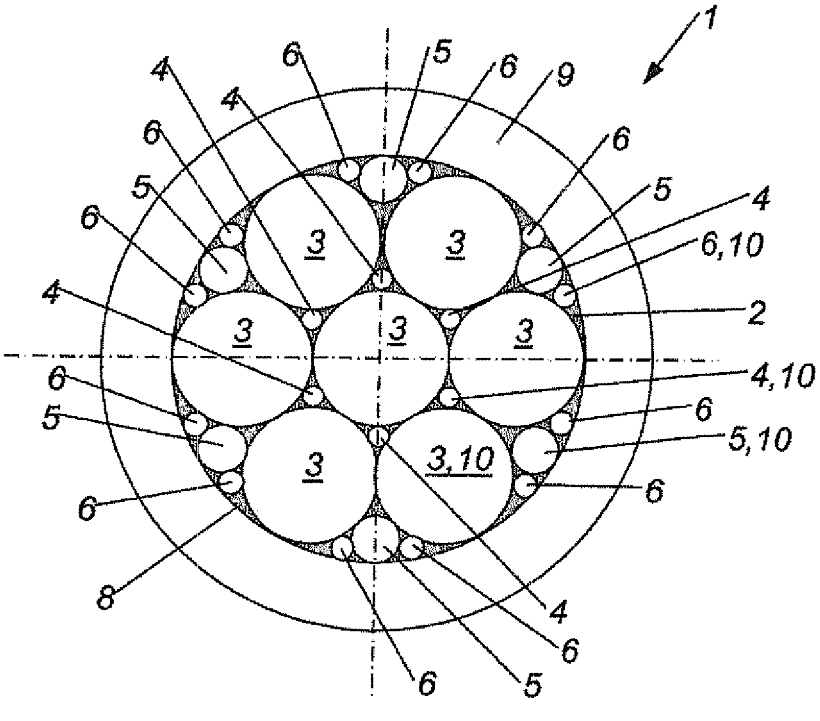
FIG. 2 shows a cross sectional view of a first embodiment of a musical string according to the present invention.
Figure 3:
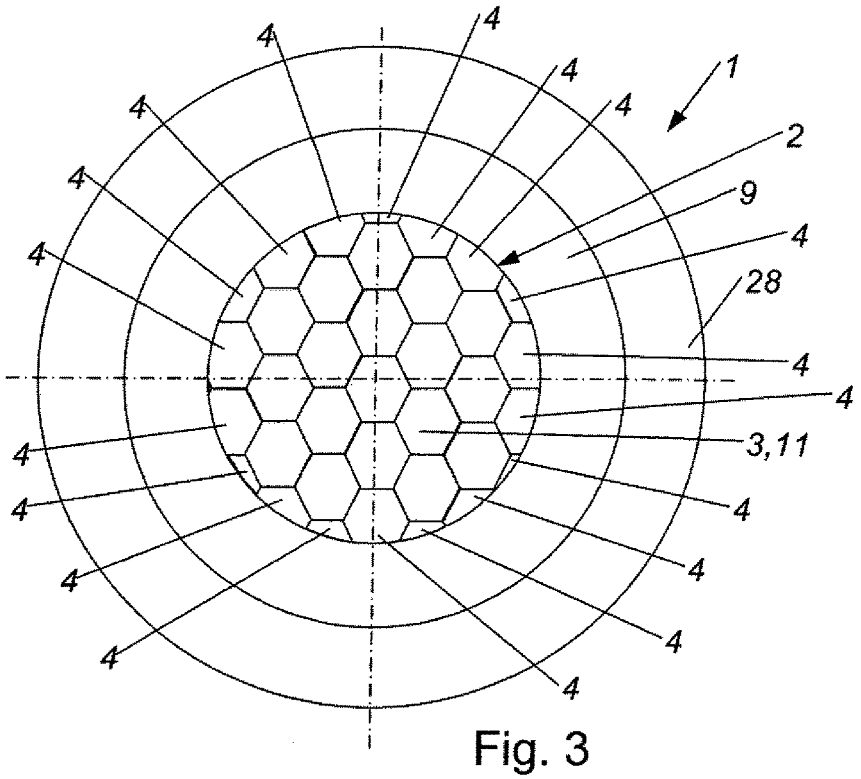
FIG. 3 shows a cross sectional view of a second embodiment of a musical string according to the present invention.

FIG. 2 shows a musical string 1 with a correspondingly designed string core 2, wherein in each case one second plastic fiber 4 is arranged in the intermediate spaces bordered by in each case three first plastic fibers 3, and wherein furthermore in each case one third plastic fiber 5 and two fourth plastic fibers 6 are arranged in the intermediate spaces which are located at the edge of the string core 2 and which are bordered by just two first plastic fibers 3. As a result, a very high packing density can be achieved in comparison to that of FIG. 1.

Figure 4:
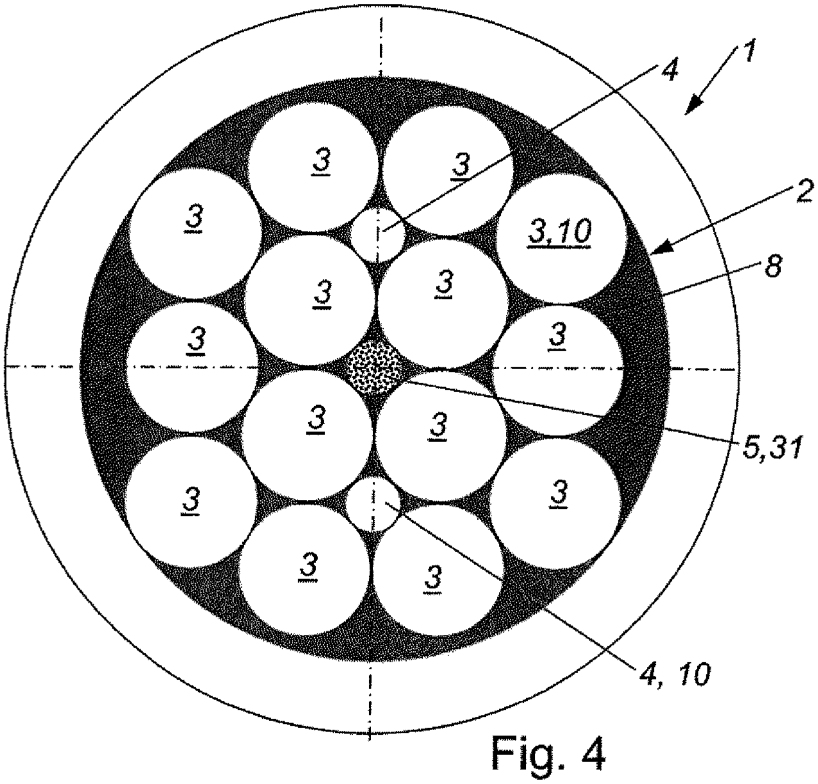
FIG. 4 shows a cross sectional view of a third embodiment of a musical string according to the present invention.

FIG. 4 shows a further musical string 1 having second plastic fibers 4 in intermediate spaces between first plastic fibers 3. The string core 2 in question additionally has around forty-five third plastic fibers 5, which are part of a circular plastic strand 31.

In particular, in order to increase the packing density in the described variants, it has proven to be practical if the first cross-sectional shape is designed as a substantially convex cross-sectional shape and is preferably substantially elliptical or circular. In terms of the implementation, it has moreover been found to be advantageous if the second cross-sectional shape is also designed in this way; however, the packing density can be increased even further when the second cross-sectional shape is designed in a concave manner, in particular in a substantially Y-shaped manner, as a result of which the second plastic fibers 4 can substantially completely fill the intermediate spaces, for example in the embodiment shown in FIG. 2.

As already shown with regard to FIG. 2, it is particularly advantageous that a predefinable plurality of first plastic fibers 3 are arranged so as to bear against one another, in particular in a packing that is geometrically as tight as possible, and that in each case at least one second plastic fiber 4 is arranged in at least one intermediate space, in particular in a plurality of the intermediate spaces, preferably in all intermediate spaces, between the first plastic fibers 3.

To achieve a particularly high packing density, it has proven to be particularly advantageous when the first cross-sectional shape is substantially hexagonal, and the first plastic fibers 3 are arranged so as to bear substantially flat against one another. As a result, a very tight packing can be achieved within the string core, wherein the individual first plastic fibers 3 moreover bear against one another over very large contact areas, as a result of which the friction effects within the string core are also particularly pronounced. It is thus possible to form a musical string 1 which tends to have a full sound and also a high degree of damping.

In this connection, it has proven to be particularly advantageous that the second plastic fibers 4 have second cross-sectional shapes which are different from one another, that the different second cross-sectional shapes each have at least two straight lines adjoining one another at an angle fitting the hexagonal cross-section of the first plastic fibers 3, in particular 120 degrees, and that the second plastic fibers 4 form only a peripheral region of the string core 2. The second plastic fibers 4 configured in this way are therefore arranged around the first plastic fibers 3. Such a musical string 1 is shown for example in FIG. 3. Such a musical string 1 can be produced for example by simply arranging first plastic fibers 3 in such a way as to protrude beyond the boundaries of the string core 2 and then grinding down or grinding into a round shape.

As discussed, the plastic fibers 3, 4, 5, 6, 7 may also differ in terms of the cross-sectional surface, that is to say the surface area thereof. Through different cross-sectional surface areas, the so-called packing density or fiber surface content, that is to say the proportion of the total surface area of the string core 2 that is filled or taken up by plastic fibers 3, 4, 5, 6, 7, can easily be increased, for example by arranging second plastic fibers 4 in intermediate spaces between first plastic fibers 3, as has already been discussed. To achieve a high packing density, it has proven to be advantageous if the first cross-sectional surface area is twelve to twenty times, in particular fifteen to seventeen times, as large as the second cross-sectional surface area. Of course, this ratio can also be reversed.

As an alternative to increasing the packing density, it may also be desired to reduce the latter. In this case, it is preferably provided that, in order to reduce a fiber surface content of a string core cross-section, the at least one first plastic fiber 3 and/or the at least one second plastic fiber 4 has a concave, in particular crescent-shaped, C-shaped or star-shaped, first and/or second cross-sectional shape. Such cross-sectional shapes have relatively small cross-sectional surface areas but cover a relatively large area, into which another body or another plastic fiber 3, 4, 5, 6, 7 can penetrate only with difficulty.

Figure 5:
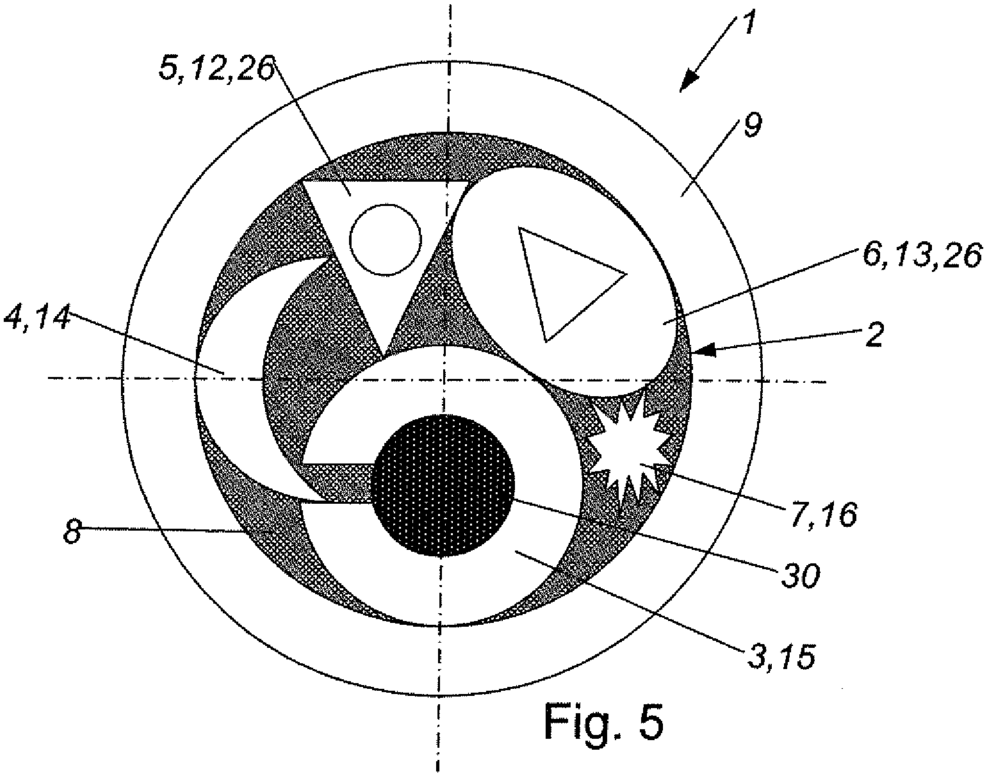
FIG. 5 shows a cross sectional view of a fourth embodiment of a musical string according to the present invention.
Figure 6:
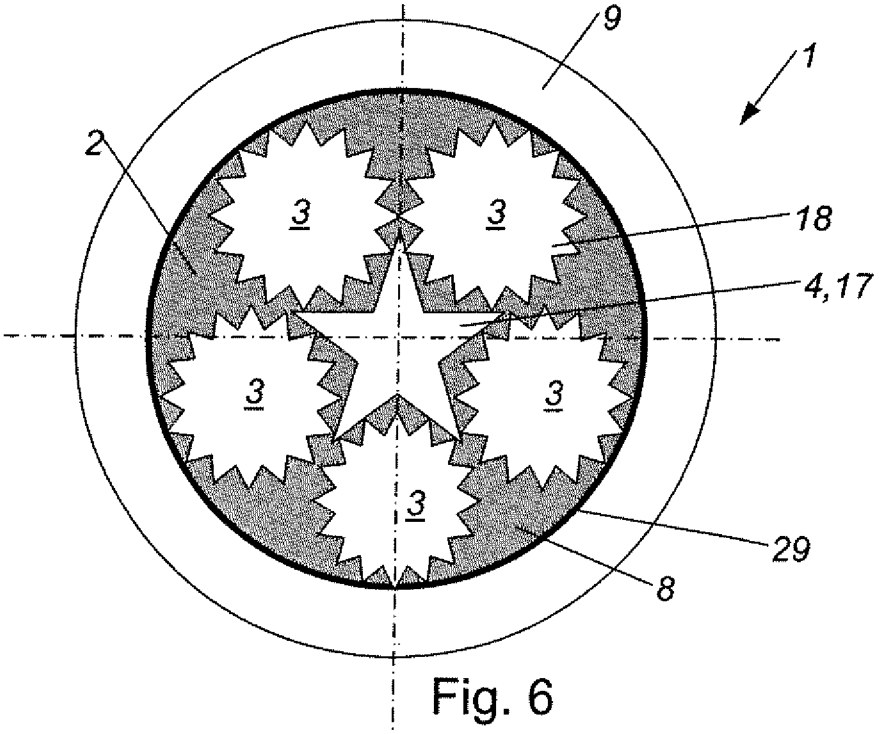
FIG. 6 shows a cross sectional view of a fifth embodiment of a musical string according to the present invention.
Figure 7:
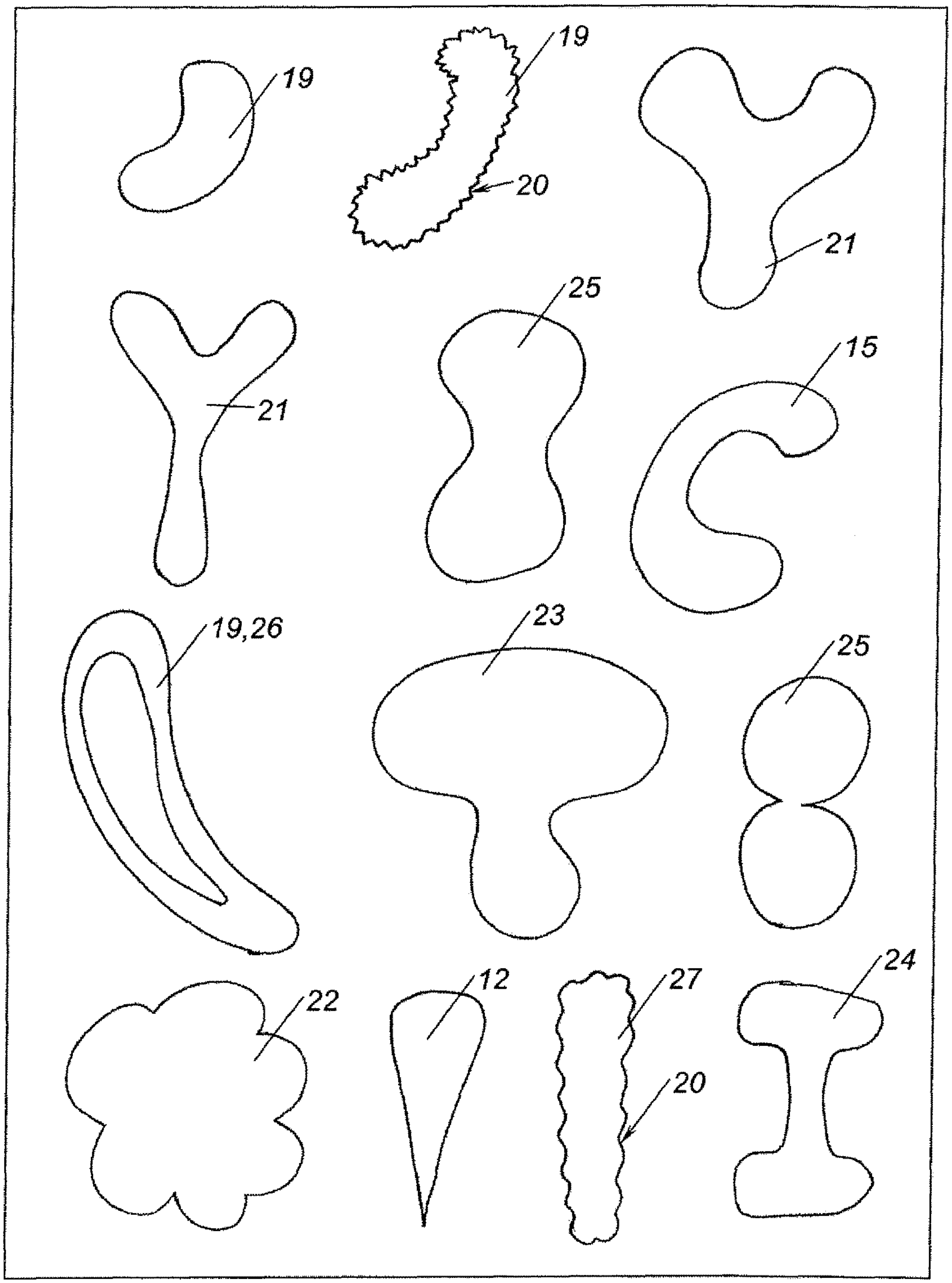
FIG. 7 shows an overview of thirteen cross-sectional shapes for plastic fibers for musical strings according to the present invention.

In this connection, it is advantageous that a second cross-sectional surface area and/or cross-sectional shape of the at least one second plastic fiber 4 is designed in such a way, and/or the at least one second plastic fiber 4 is arranged relative to an opening of a first plastic fiber 3 in such a way, that the second plastic fiber 4 is arranged substantially outside the first plastic fiber 3, and in particular also remains there during the playing of the musical string 1. FIGS. 5 and 6 show correspondingly designed musical strings 1.

The musical string 1 shown in FIG. 6 has one first plastic fiber 3, which is shaped as a regular five-pointed star 17. A second plastic fiber 4 in the shape of a regular sixteen-pointed star 18 is arranged in each of the concave opening regions of this cross-section.

The musical string 1 shown in FIG. 5 has five differently configured plastic fibers 3, 4, 5, 6, 7. The first plastic fiber 3 has a C-shaped cross-section 15. The second plastic fiber 4 has a crescent-shaped cross-section 14. The third plastic fiber 5 has a triangular cross-section 12, and is moreover designed as a hollow fiber 26 with a circular cavity. The fourth plastic fiber 5 has an elliptical cross-section 13, and is moreover designed as a hollow fiber 26 with a triangular cavity. The fifth plastic fiber 7 has the cross-section of an irregular star 16. FIG. 5 serves as an example or illustration of a string core 2 having mixed plastic fibers 3, 4, 5, 6, 7. By virtue of such mixtures, diverse and unusual properties can be achieved on musical strings 1.

It is furthermore preferably provided, and shown in FIGS. 2, 4, 5, 6 and 8, that the plastic fibers 3, 4, 5, 6, 7 of the string core 2 are wetted with at least one first fluid 8 in a predefinable manner. As a result, it is possible to influence, besides the internal friction, damping and bonding, also the age-related change in the plastic fibers 3, 4, 5, 6, 7, for instance via the extent of the physical and/or chemical interaction of the first fluid 8 with the plastic fibers 3, 4, 5, 6, 7.

It is furthermore advantageous that at least one second fluid 29 is arranged between the string core 2 and the first wrapping layer 9, as a result of which the damping and also the bonding can be further influenced. Such a second fluid 29 is shown for example in FIG. 6.

It may moreover be provided that, in the case of concave cross-sectional shapes, particularly in the case of C-shaped cross-sections, a third fluid 30 is arranged in the cross-section itself, as shown for example in FIG. 5. During playing, a mixing of the first fluid 8 and of the third fluid 30 occurs, as a result of which the effect of the first fluid 8 can be changed.

The first, second and/or third fluid 8, 29, 30 is advantageously designed to include wax, in particular natural waxes, such as for example beeswax or carnauba wax, and/or synthetic waxes, such as for example polyolefin waxes, paraffin, oil, for example fatty oils, mineral oils and/or synthetic oils, resin, in particular natural resins, for example larch resin and/or spruce resin, and/or synthetic resins, for example polyester resin, phenol resin and/or epoxy resin, wherein further additives may be provided, for example metal powder.

Depending on the type of fluid 8, 29, 30 or on the combination of fluid 8, 29, 30 and type of plastic of the plastic fibers 3, 4, 5, 6, 7, the fluid 8, 29, 30 in question acts as a lubricant or as an adhesive, wherein in this connection an adhesive will be understood to mean a permanently elastic or permanently liquid adhesive agent.

The interaction between the plastic fibers 3, 4, 5, 6, 7 and a surrounding fluid 8, 29, 30 can furthermore be influenced in a predefinable manner if the first plastic fiber 3 and/or the second plastic fiber 4 has a predefinable surface roughness, in particular a predefinably smooth or corrugated surface 20.

Of course, it is also possible for just a gas to be provided instead of the first, second and/or third fluid 8, 29, 30.

Figure 8:
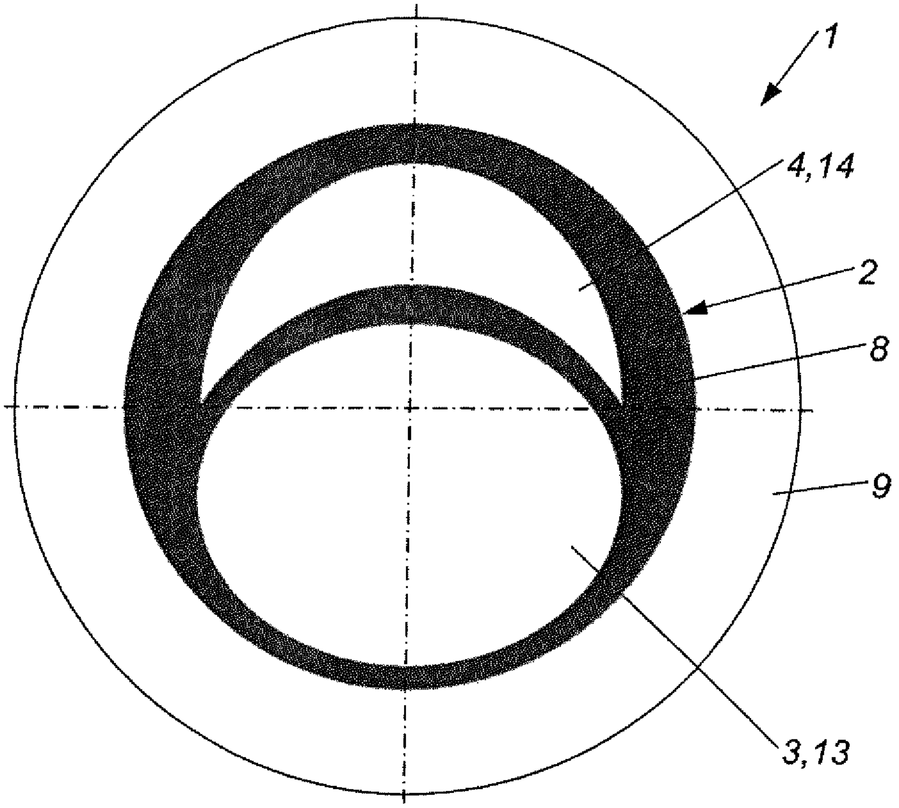
FIG. 8 shows a cross sectional view of a sixth embodiment of a musical string according to the present invention.

FIG. 8 shows a further embodiment of a musical string 1 according to the present invention, wherein the string core 2 has only one first plastic fiber 3 and one second plastic fiber 4. Here, the first plastic fiber 3 has an elliptical cross-section 13. The second plastic fiber 4 has a crescent-shaped cross-section 14. The two plastic fibers 3, 4 do not touch one another and therefore also do not bear against one another, and are surrounded by a first fluid 8. It may be provided both that just one individual first plastic fiber 3 and one individual second plastic fiber 4 in a string core 2 touch one another and that a greater number of plastic fibers 3, 4, 5, 6, 7, as provided for example in FIGS. 2, 3, 4, 5 and 6, do not touch one another, contrary to what is shown in the drawings.

To produce a musical string according to the invention or the string core 2 for a musical string 1, it is provided that a predefinable number of first plastic fibers 3 and a predefinable number of second plastic fibers 4 are passed through a perforated mask and then brought together, wherein the position of the individual plastic fibers 3, 4 relative to one another is determined by the perforated mask.

In this case, it may be provided that plastic fibers 3, 4, 5, 6, 7 which already have a suitable cross-sectional shape or cross-sectional surface area are merely passed through the perforated mask. However, it may also be provided that the perforated mask itself gives the plastic fibers 3, 4, 5, 6, 7 their cross-sectional shape and cross-sectional surface area.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A musical string, in particular a musical string for a string instrument, comprising a load-bearing string core including first and second plastic fibers, with the first plastic fiber having a first cross-sectional shape and a first cross-sectional surface area, and with the second plastic fiber having a second cross-sectional shape and a second cross-sectional surface area, wherein the first cross-sectional shape is different from the second cross-sectional shape, and/or wherein the first cross-sectional surface area is different from the second cross-sectional surface area.

2. The musical string of claim 1, wherein the first plastic fiber is arranged so as to bear against the second plastic fiber.

3. The musical string of claim 1, wherein the first cross-sectional shape and/or the second cross-sectional shape is circular or elliptical or kidney-shaped or star-shaped or crescent-shaped or cloud-shaped or mushroom-shaped or bone-shaped or number-eight-shaped or Y-shaped or X-shaped or C-shaped or polygonal, in particular triangular, quadrangular, pentagonal or hexagonal.

4. The musical string of claim 1, wherein the first plastic fiber and/or the second plastic fiber is designed as a solid fiber or as a hollow fiber.

5. The musical string of claim 1, wherein the first and second plastic fibers are formed of a same type of plastic.

6. The musical string of claim 1, wherein the first plastic fiber and/or the second plastic fiber has a predefinable surface roughness, in particular a predefinably smooth or corrugated surface.

7. The musical string of claim 1, wherein the string core includes at least two, in particular at least three, first plastic fibers arranged so as to bear against one another in a predefinable manner, said second plastic fiber being arranged adjacent to the at least two first plastic fibers, preferably in at least one intermediate space between the first plastic fibers.

8. The musical string of claim 1, wherein the first cross-sectional shape, and preferably the second cross-sectional shape, is designed as a substantially convex cross-sectional shape and is preferably substantially elliptical or circular.

9. The musical string of claim 1, wherein the string core includes more than two of said first plastic fiber arranged so as to bear against one another, in particular in a packing that is geometrically as tight as possible, said string core having a plurality of said second plastic fiber arranged such that in at least one intermediate space, in particular in a plurality of intermediate spaces, preferably in all intermediate spaces, between the first plastic fibers a corresponding one of the second plastic fibers is arranged.

10. The musical string of claim 7, wherein the first cross-sectional shape is substantially hexagonal, said first plastic fibers being arranged so as to bear substantially flat against one another.

11. The musical string of claim 1, wherein the string core includes a plurality of second plastic fibers of different second cross-sectional shapes, each said second cross-sectional shapes having at least two straight lines adjoining one another at an angle of 120 degrees, said second plastic fibers forming only a peripheral region of the string core.

12. The musical string of claim 1, wherein the first cross-sectional shape of the first plastic fiber and/or the second cross-sectional shape of the second plastic fiber has a concave configuration, in particular a crescent-shaped, C-shaped or star-shaped configuration in order to reduce a fiber surface content of a string core cross-section.

13. The musical string of claim 1, wherein the second plastic fiber is arranged substantially outside the first plastic fiber by correspondingly designing the second cross-sectional surface area and/or cross-sectional shape of the second plastic fiber and/or by correspondingly arranging the second plastic fiber relative to an opening of a first plastic fiber.

14. The musical string of claim 1, wherein the first cross-sectional surface area is twelve to twenty times, in particular fifteen to seventeen times, as large as the second cross-sectional surface area.

15. The musical string of claim 1, wherein the string core includes a third plastic fiber having a third cross-sectional shape and a third cross-sectional surface area, said third plastic fiber arranged so as to bear against the first plastic fiber and the second plastic fiber, wherein the third cross-sectional shape is different from the first cross-sectional shape and from the second cross-sectional shape, and/or wherein the third cross-sectional surface area is different from the first cross-sectional surface area and from the second cross-sectional surface area.

16. The musical string of claim 9, wherein at least one of the first plastic fibers and at least one of the second plastic fiber are formed of a same type of plastic.

17. The musical string of claim 15, wherein at least one of the first, second and third plastic fibers is formed of a self-healing plastic.

18. The musical string of claim 1, wherein the string core includes a plastic strand formed from the first and second plastic fibers, and further comprising a fluid to wet the plastic strand in a predefinable manner.

19. The musical string of claim 1, further comprising a first wrapping layer arranged around the string core, wherein preferably a fluid is arranged between the string core and the first wrapping layer.

20. A method for producing a string core for a musical string, comprising:

passing a predefinable number of first plastic fibers and a predefinable number of second plastic fibers through a perforated mask; and bringing the first plastic fibers and the second plastic fibers together, with a position of the first and second plastic fibers relative to one another being determined by the perforated mask.

* * * * *